United States Patent
Pai et al.

(10) Patent No.: US 11,650,912 B2
(45) Date of Patent: May 16, 2023

(54) MACHINE LEARNING BASED SOFTWARE TESTING ORCHESTRATION

(71) Applicant: SAP SE, Walldorf (DE)

(72) Inventors: Harihar Pai, Bangalore (IN); Kavitha Alagesan, Coimbatore (IN); Nagendra Reddy Devireddy, Bangalore (IN)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 17/468,962

(22) Filed: Sep. 8, 2021

(65) Prior Publication Data

US 2023/0073760 A1  Mar. 9, 2023

(51) Int. Cl.
*G06F 11/36* (2006.01)
*G06F 9/445* (2018.01)
*G06N 5/04* (2023.01)

(52) U.S. Cl.
CPC ...... *G06F 11/3688* (2013.01); *G06F 9/44594* (2013.01); *G06N 5/04* (2013.01)

(58) Field of Classification Search
CPC .................................................. G06F 11/362
See application file for complete search history.

(56) References Cited

U.S. PATENT DOCUMENTS

| 2008/0282235 | A1* | 11/2008 | Jadhav | G06F 11/3676 717/131 |
| 2011/0231708 | A1* | 9/2011 | Lawrance | G06F 11/3684 714/E11.217 |
| 2019/0332523 | A1* | 10/2019 | Gefen | G06N 20/00 |
| 2021/0382814 | A1* | 12/2021 | Moondhra | G06F 11/3692 |

* cited by examiner

*Primary Examiner* — Jae U Jeon
(74) *Attorney, Agent, or Firm* — Mintz Levin Cohn Ferris Glovsky and Popeo, P.C.

(57) ABSTRACT

A method may include applying to at least a portion of historical runtimes associated with each of a plurality of tests included in a test suite, a machine learning model trained to identify one or more outlying runtime values. The portion of historical runtimes may include an n quantity of the most recent historical runtimes. An expected runtime for each test may be determined based on the portion of historical runtimes excluding the outlying runtime values. A schedule for executing each test in the test suite may be determined based on the expected runtime of each test. The test suite may be executed in accordance with the schedule. Moreover, the executing of the test suite may be monitored based on the expected runtime of each test. Related systems and computer program products are also provided.

20 Claims, 8 Drawing Sheets

FIG. 3B

MACHINE LEARNING BASED SOFTWARE TESTING ORCHESTRATION

TECHNICAL FIELD

The subject matter described herein relates generally to software development and more specifically to a machine learning based technique for scheduling and monitoring software testing.

BACKGROUND

The development lifecycle of a software product and/or updates to the software product may include a sequence of stages including, for example, development, testing, acceptance, production, and/or the like. For instance, the software product may be developed on a development system before undergoing testing in a test environment that closely mimics the production environment for the software product. The software product may subsequently be released to an acceptance test environment for testing by an end user. If the end user accepts the product, then the product may be deployed into the production environment where the software product is made available for use.

SUMMARY

Systems, methods, and articles of manufacture, including computer program products, are provided for machine learning based orchestration of software testing. In one aspect, there is provided a system. The system may include at least one data processor and at least one memory. The at least one memory may store instructions that cause operations when executed by the at least one data processor. The operations may include: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

In some variations, one or more features disclosed herein including the following features can optionally be included in any feasible combination. The portion of historical runtimes may include an n quantity of most recent runtimes.

In some variations, the portion of historical runtimes may further exclude outdated historical runtimes that are not part of then quantity of most recent runtimes.

In some variations, the expected runtime of each of the plurality of tests may correspond to an average, a mode, a medium, a maximum, and/or a minimum of the portion of historical runtimes excluding the one or more outlying runtime values.

In some variations, the machine learning model may include one or more of a hierarchical clustering, a centroid-based clustering, a distribution-based clustering, a density-based clustering, and a grid-based clustering.

In some variations, the machine learning model may include one or more of a support vector machine, a neural network, a Bayesian network, a Hidden Markov model, an association rule learning, and fuzzy logic.

In some variations, the schedule may be determined by at least determining, based at least on the expected runtime of each of the plurality of tests, a first sequence of tests that is executed in parallel with a second sequences of tests.

In some variations, the schedule may be determined by at least distributing, based on the expected runtime for each of the plurality of tests, the plurality of tests for execution across a plurality of test environments.

In some variations, the schedule may be determined by at least scheduling a first test with a longer expected runtime for execution before a second test with a shorter expected runtime.

In some variations, the operations may further include: monitoring, based at least on the expected runtime of each of the plurality of tests, the executing of the test suite.

In some variations, the monitoring may include terminating the executing of a test in the test suite in response to the test exceeding an expected runtime of the test by a threshold quantity.

In some variations, the monitoring may include terminating the executing of the test suite in response to more than a threshold quantity of tests in the test suite exceeding a corresponding expected runtime.

In another aspect, there is provided a method for machine learning based orchestration of software testing. The method may include: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

In some variations, one or more features disclosed herein including the following features can optionally be included in any feasible combination. The portion of historical runtimes may include an n quantity of most recent runtimes. The portion of historical runtimes may further exclude outdated historical runtimes that are not part of the n quantity of most recent runtimes.

In some variations, the schedule may be determined by at least distributing, based on the expected runtime for each of the plurality of tests, the plurality of tests for execution across a plurality of test environments.

In some variations, the schedule may be determined by at least scheduling a first test with a longer expected runtime for execution before a second test with a shorter expected runtime.

In some variations, the method may further include: monitoring, based at least on the expected runtime of each of the plurality of tests, the executing of the test suite.

In some variations, the monitoring may include terminating the executing of a test in the test suite in response to the test exceeding an expected runtime of the test by a threshold quantity.

In some variations, the monitoring may include terminating the executing of the test suite in response to more than a threshold quantity of tests in the test suite exceeding a corresponding expected runtime.

In another aspect, there is provided a computer program product that includes a non-transitory computer readable storage medium. The non-transitory computer-readable storage medium may include program code that causes operations when executed by at least one data processor. The operations may include: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the scheduling and monitoring of software testing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3B depicts a table illustrating examples of test schedules and the corresponding savings in time, in accordance with some example embodiments;

When practical, similar reference numbers denote similar structures, features, or elements.

DETAILED DESCRIPTION

Figure 1A:
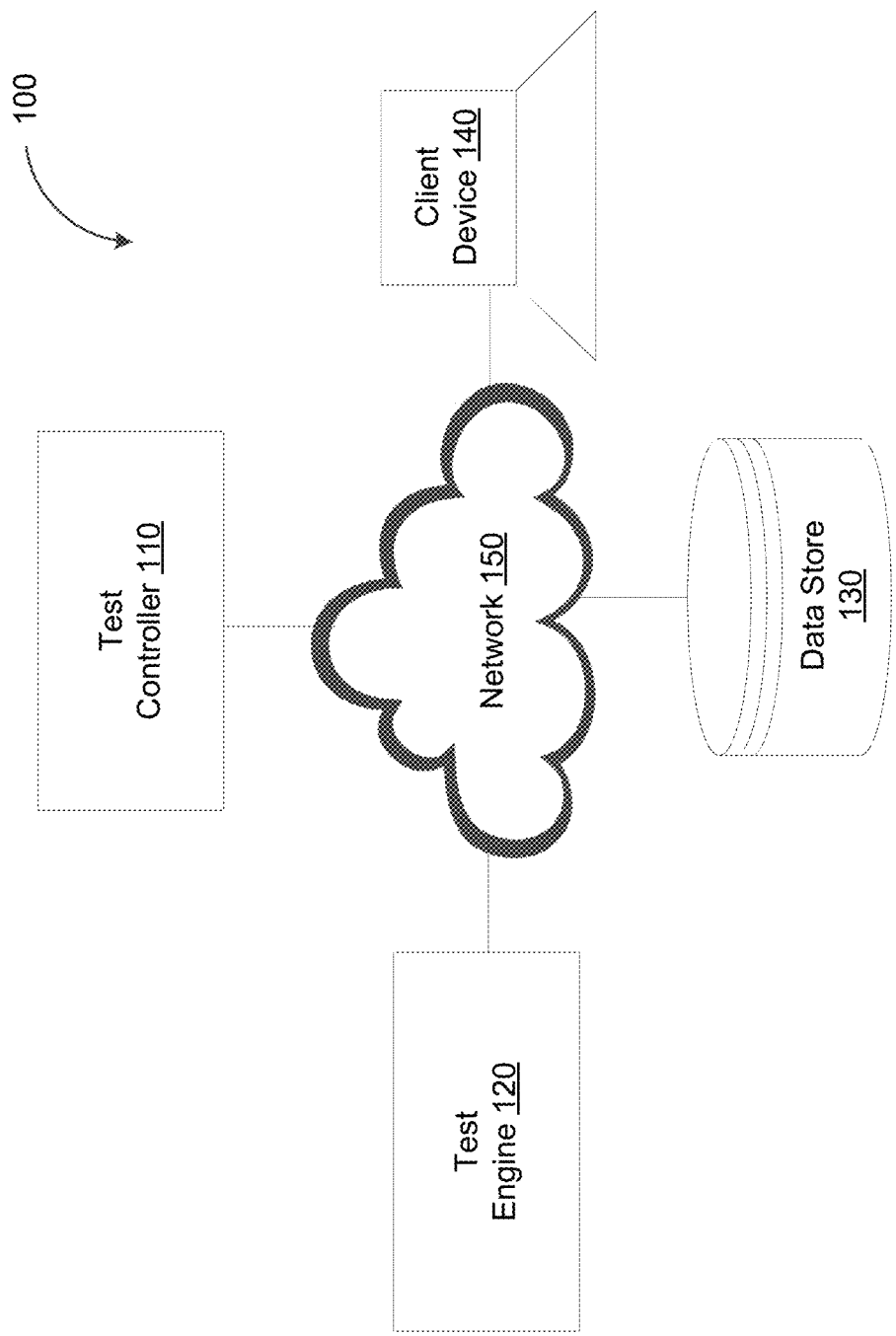
FIG. 1A depicts a system diagram illustrating an example of a software testing system, in accordance with some example embodiments.

The development of a new software product may include extensive testing to verify that the software product provides the desired features and functionalities, and is free from errors that may engender incorrect or unexpected results when the software product is deployed for use. For example, the software product may be developed, in accordance with end user specifications, to include certain features and functionalities. Before being released into a product environment, the software product may undergo a battery of cross-platform tests including, for example, web testing, application programming interface (API) testing, desktop testing, component qualification (CQ), build qualification (BQ), and/or the like.

A comprehensive test suite may include numerous individual tests. The software product may therefore be subjected to a protracted testing period, which may impose significant delays to the deployment of the software product. Parallelization in which the tests in the test suite are executed in parallel across multiple test environments may provide minimal time savings if the tests are scheduled indiscriminately such as, for example, when too many tests with long runtimes are inadvertently scheduled for execution in the same test environment. As such, in some example embodiments, a test controller may be configured to orchestrate the testing of a software product based on the expected runtime of each test included in a test suite associated with the software product. For example, the test controller may prioritize tests with longer expected runtimes over tests with shorter expected runtimes and distribute the tests with the longer expected runtimes for parallel execution across the test environments such that the overall runtime of the test suite is abbreviated.

To determine the expected runtime of a test included in the test suite, the test controller may apply, to the historical runtimes of the test, a machine learning model trained to detect one or more outlying runtime values, such as historical runtimes that are abnormally long or abnormally short. The test controller may determine the expected runtime of the test without these outlying runtime values to avoid distorting its computation. Accordingly, instead of determining an average across all historical runtimes associated with the test, the test controller may compute an average of the non-outlying runtime values. Moreover, in some example embodiments, the test controller may monitor the progress of the testing to detect when one or more tests in the test suite exhibit above-threshold deviations from the expected runtimes of these tests. For example, when the runtime of a test exceeds the expected runtime of the test by a threshold quantity, the test controller may determine that the test is likely to fail and generate a recommendation to terminate the test before the test is executed in its entirety. Alternatively and/or additionally, when more than a threshold quantity of tests in the test suite exceed their expected runtimes, the test controller may determine that the test suite is likely to fail and thus generate a recommendation to terminate the test suite before the test suite is executed in its entirety. Additional time savings may be realized by not fully executing tests and/or test suites that are likely to fail.

FIG. 1A depicts a system diagram illustrating an example of a testing system 100, in accordance with some example embodiments. Referring to FIG. 1A, the testing system 100 may include a test controller 110, a test engine 120, a data store 130, and a client device 140. As shown in FIG. 1A, the test controller 110, the test engine 120, the data store 130, and the client device 140 may be communicatively coupled via a network 150. The data store 130 may be a database including, for example, a relational database, a non-relational database, an in-memory database, and/or the like. The client device 140 may be a processor-based device including, for example, a smartphone, a tablet computer, a wearable apparatus, a virtual assistant, an Internet-of-Things (IoT) appliance, and/or the like. The network 150 may be any wired and/or wireless network including, for example, a public land mobile network (PLMN), a wide area network (WAN), a local area network (LAN), a virtual local area network (VLAN), the Internet, and/or the like.

The test controller 110 may be configured to orchestrate the testing of a software product at the test engine 120 including by scheduling and monitoring the testing of the software product. For example, the testing of the software product may include executing the individual tests included in a test suite. Although the test engine 120 may include multiple test environments (e.g., multiple systems or realms emulating the production environment for the software product) such that the tests included in the test suite can be executed in parallel, minimal time savings may be achieved if the tests are scheduled indiscriminately across the test environments. Accordingly, the test controller 110 may orchestrate the testing of the software product based on the expected runtime of each test included in the test suite. To minimize the overall runtime associated with the test suite, the test controller 110 may prioritize tests with longer expected runtimes over tests with shorter expected runtimes and distribute the tests with the longer expected runtimes for parallel execution across the test environments.

Figure 1B:
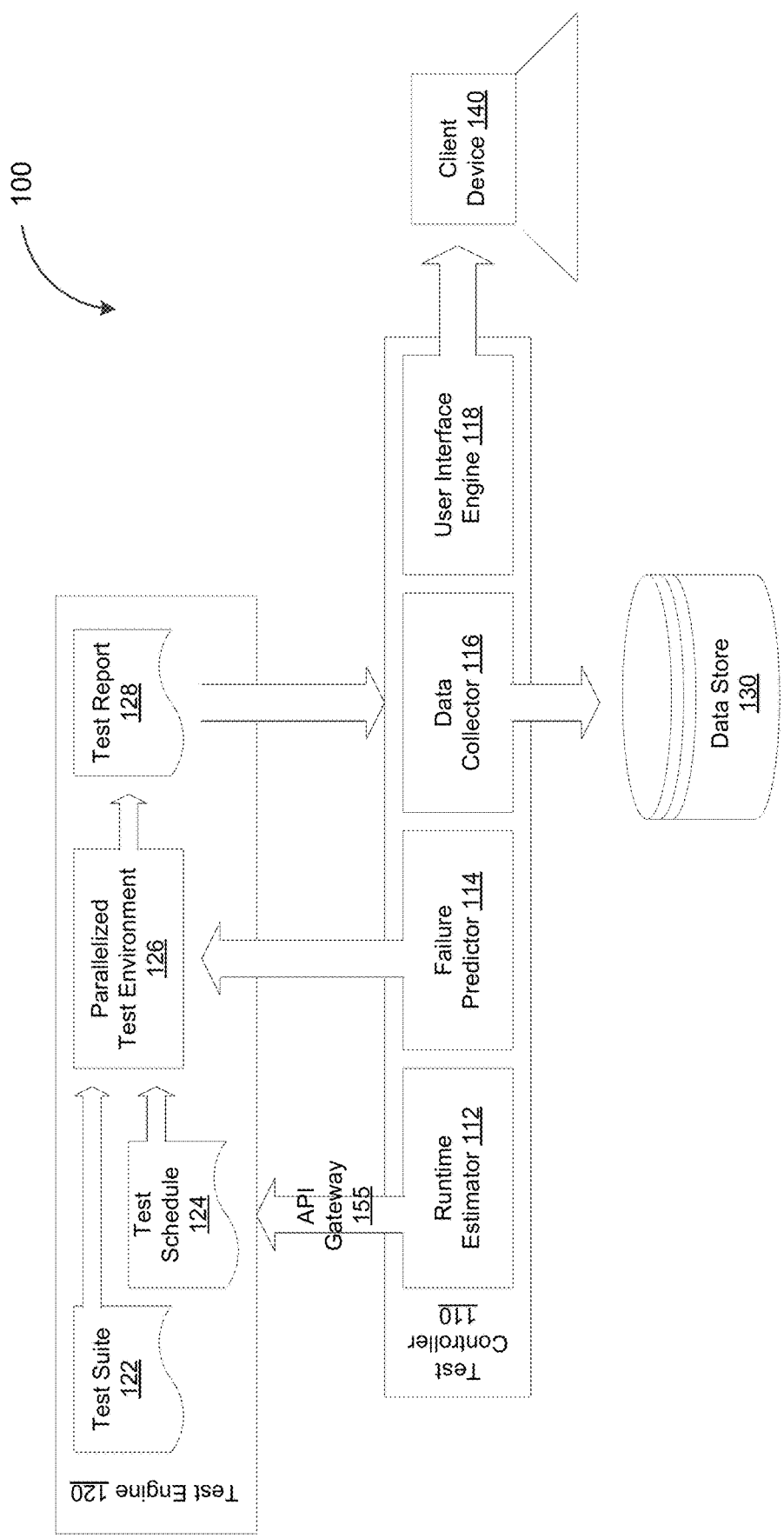
FIG. 1B depicts a block diagram illustrating an example of a software testing system, in accordance with some example embodiments.
Figure 3A:
FIG. 3A depicts a table illustrating examples of expected runtimes for various tests, in accordance with some example embodiments.

FIG. 1B depicts a system diagram illustrating an example of the testing system 100, in accordance with some example embodiments. As shown in FIG. 1B, the test engine 120 may include a parallelized test environment 126 for executing a test suite 122 including a battery of different tests. The test controller 110 may include a runtime estimator 112 configured to determine an expected runtime for each test included in the test suite 122 and generate a test schedule 124 for executing the tests included in the test suite 122 in the parallelized test environment 126. To further illustrate, FIG. 3A depicts a table 300 illustrating examples of expected runtimes for various tests that may be included in the test suite 122.

Figure 2A:
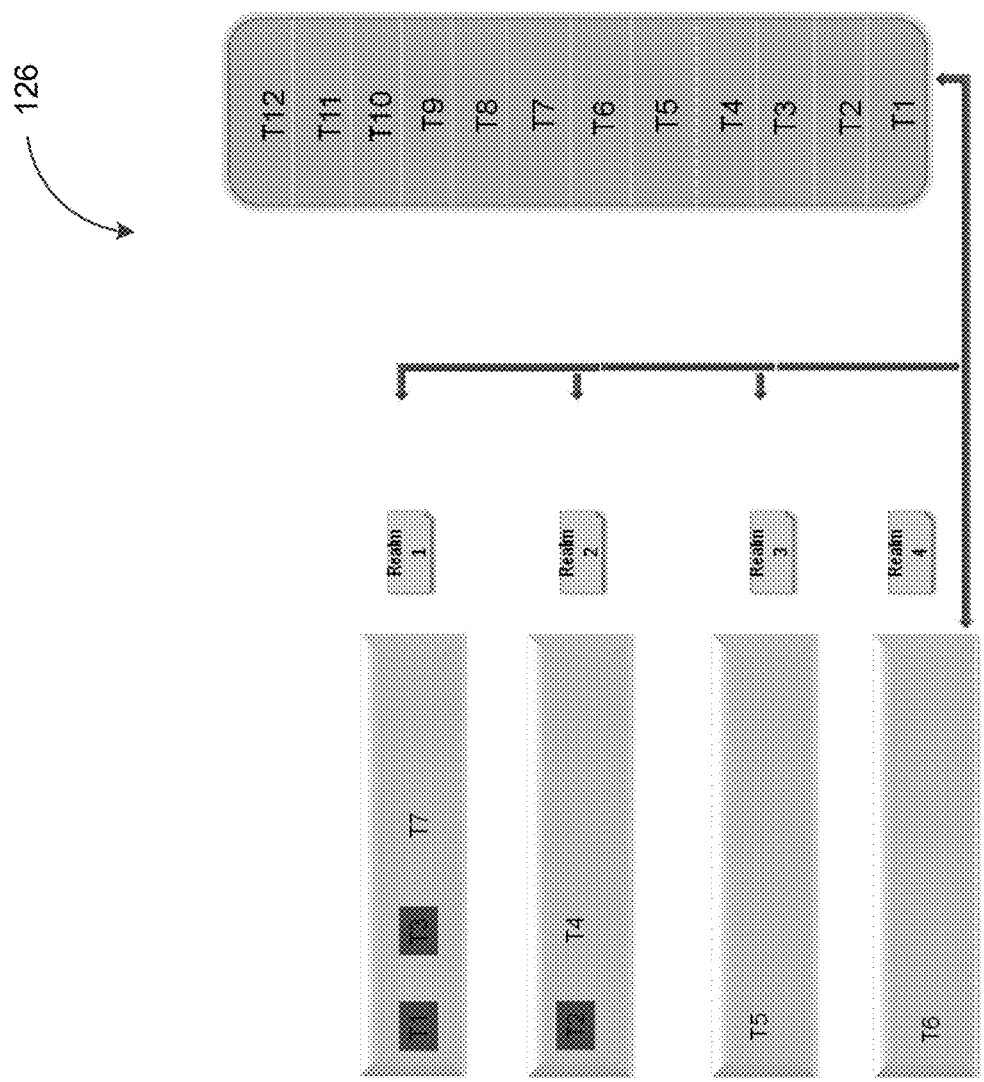
FIG. 2A depicts a schematic diagram illustrating an example of a parallelized testing environment, in accordance with some example embodiments.

An example of the parallelized test environment 126 is shown in FIG. 2A. In the example shown in FIG. 2A, the parallelized test environment 126 may include four realms, each of which including the software and hardware resources configured to emulate the production environment of the software product associated with the test suite 122. Each test included in the test suite 122 (e.g., tests $T_1$, $T_2$, $T_3$, and/or the like) may be scheduled for execution in one of the four realms included in the parallelized test environment 126. Accordingly, the scheduling may include determining the sequence of tests that are executed in each realm.

Figure 3B:
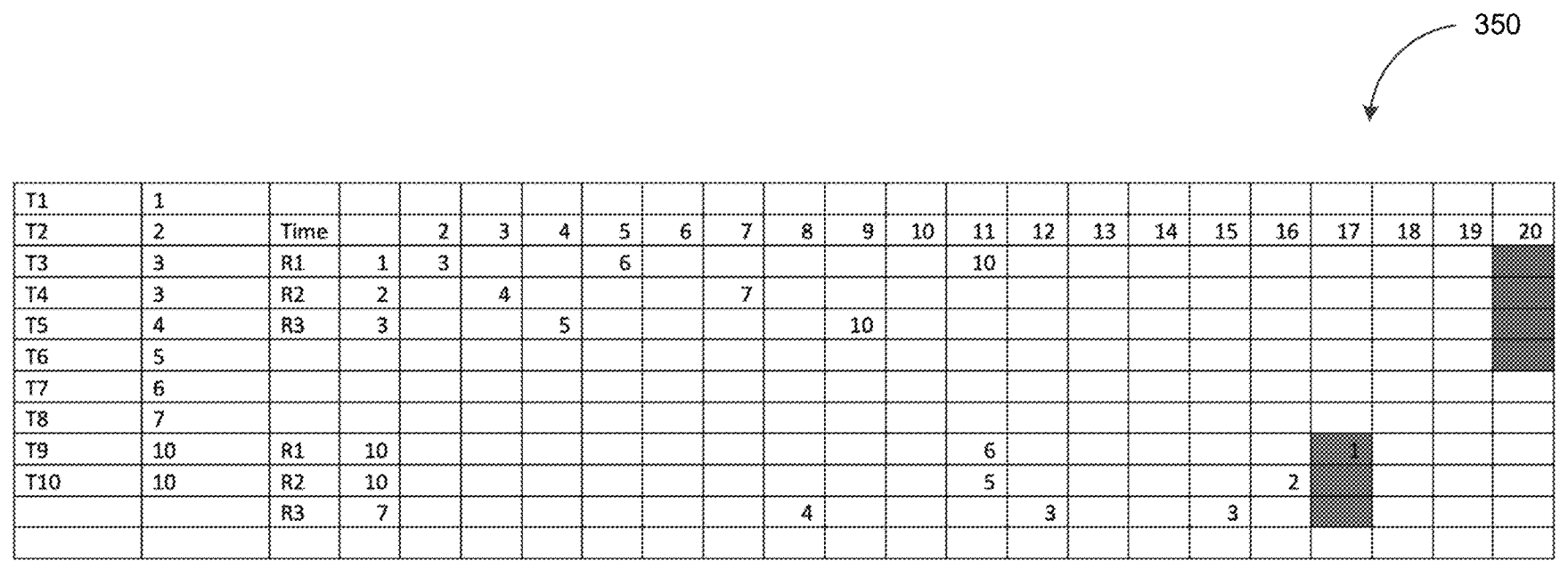

In some example embodiments, the runtime estimator 112 may generate the test schedule 124 to minimize the overall runtime of the test suite 122. In the example of the testing system 110 shown in FIG. 1B, the runtime estimator 112 may send the test schedule 124 to the test engine 120 via an application programming interface (API) gateway 155 (e.g., a representational state transfer (REST) API gateway, a simple object access protocol (SOAP) API gateway, and/or the like). One example strategy to minimize the overall runtime of the test suite 122 may be to schedule tests with longer expected runtimes for execution before tests with shorter expected runtimes. The overall runtime of the test suite 122 may be minimized by distributing the tests with the longer expected runtimes for execution across the parallelized test environment 126. FIG. 3B depicts a table 350 illustrating examples of test schedules and the corresponding savings in time, in accordance with some example embodiments.

In some example embodiments, the test controller 110 may include a failure predictor 114 configured to monitor the progress of the testing to detect when one or more tests in the test suite 122 exhibit an above-threshold deviation from the expected runtimes of these tests. For example, when the runtime of a test exceeds the expected runtime of the test by a threshold quantity, the failure predictor 114 may determine that the test is likely to fail and generate a recommendation to terminate the test before the test is executed in its entirety. Alternatively and/or additionally, when more than a threshold quantity of tests in the test suite 122 exceed their expected runtimes, the failure predictor 114 may determine that the test suite 122 is likely to fail and thus generate a recommendation to terminate the test suite before the test suite is executed in its entirety. As shown in FIG. 1B, the test controller 110 may include a user interface engine 118 configured to generate, for display at the client device 140, a user interface including the progress of the testing and the recommendations to abort the test suite 122 or any of the tests included in the test suite 122. Additional time savings may be realized by not fully executing tests and/or test suites that are likely to fail.

The expected runtime of a test included in the test suite 122 may be determined based on the historical runtimes associated with the test. As used herein, the term "historical runtimes" may refer to the runtimes of one or more tests executed at an earlier time. The historical runtimes of the test may be stored in the data store 130. Thus, as shown in FIG. 1B, the test controller 110 may include a data collector 116 configured to update the data store 130 with the runtimes of the various tests from the test suite 122. For example, upon executing at least one test from the test suite 122, the test engine 120 may generate a test report 128 including the corresponding runtimes. The data collector 116 may update the data store 130 based at least on the runtimes included in the test report 128.

In some example embodiments, the expected runtime of a test included in the test suite 122 may be determined by applying to the historical runtimes of the test (e.g., from the data store 13), a machine learning model trained to detect one or more outlying runtime values. The historical runtimes of the test may include one or more outlying runtime values. Examples of outlying runtime values may include runtimes that are abnormally long or abnormally short due to anomalous conditions such as a network outage or a failure within the testing environment. Including outlying runtime values in the expected runtime computation may distort the resulting value. As such, the test controller 110, for example, the runtime estimator 112, may compute the expected runtime of the test without the outlying runtime values identified by applying the machine learning model. For example, instead of an average across all historical runtimes associated with the test, the expected runtime of the test may correspond to an average of the non-outlying runtime values. Alternatively and/or additionally, the expected runtime of the test may correspond to a mode, a medium, a maximum, and/or a minimum of the non-outlying runtime values.

In some example embodiments, outlying runtime values may be detected by applying, to the historical runtimes of the test, one or more anomaly detection techniques. One example of anomaly detection technique include a clustering algorithm such as hierarchical clustering, centroid-based clustering, distribution-based clustering, density-based clustering, and grid-based clustering. Other examples of anomaly detection techniques that may be applied to identifying outlying runtime values include support vector machines, neural networks, Bayesian networks, Hidden Markov models, association rule learning, and fuzzy logic.

Figure 2B:
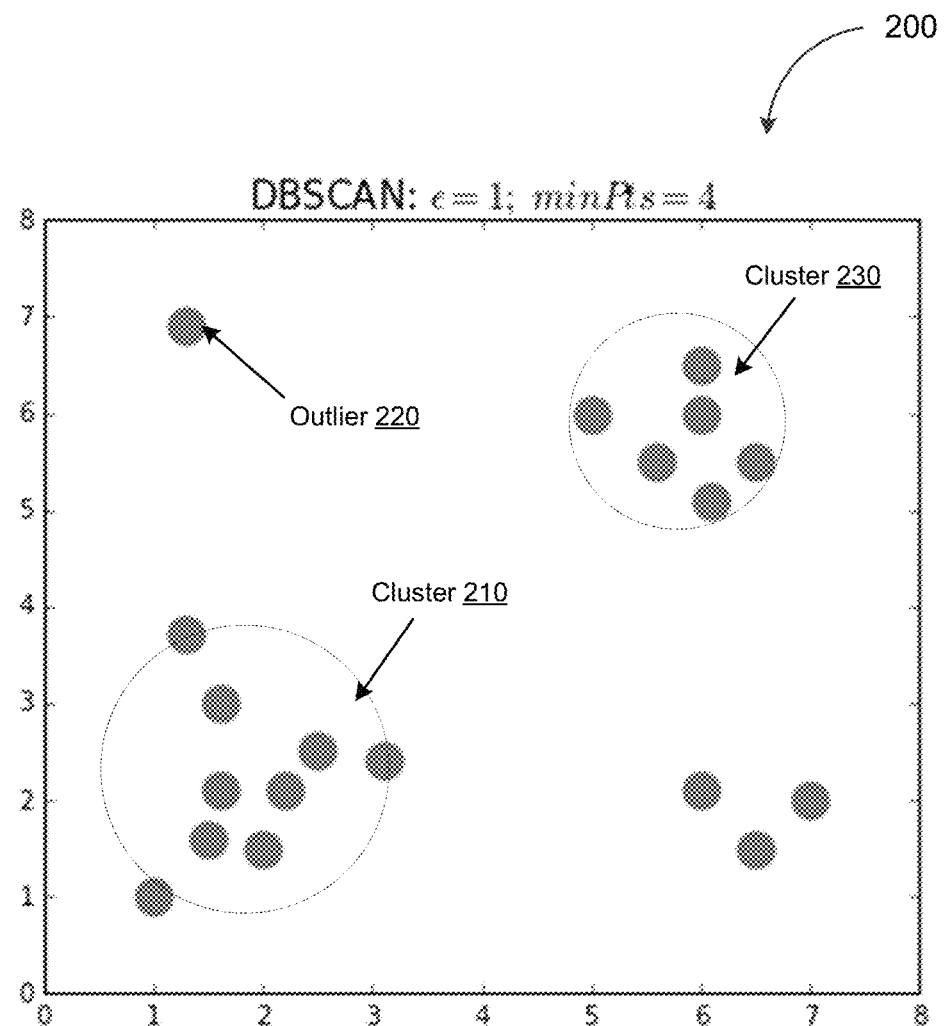
FIG. 2B depicts a graph illustrating an example of a clustering algorithm being applied towards outlier detection, in accordance with some example embodiments.

FIG. 2B depicts a graph 200 illustrating an example of a clustering algorithm being applied towards outlier detection, in accordance with some example embodiments. According to some example embodiments, various runs of a test included in the test suite 122 may be clustered based on the runtime associated with each run of the test. In some cases, various runs of the test may be clustered based on additional features, particularly those features that may affect the runtime of the test. For example, in addition to the runtime associated with each run of the test, various runs of the test may be clustered based on the software resources and/or hardware resources used for executing each run. Table 1 below depicts some examples of features for clustering various runs of a test included in the test suite 122.

TABLE 1

| FeatureId | Feature Name | Feature Title |
| --- | --- | --- |
| PL-31314 | API Key validation | API Key validation |
| PL-26600 | AML Extension Versioning | AML Versioning |
| PL-33617 | Caching for SvcMgt | Improve performance of Get All Realms API |
| PL-33609 | Feature Toggle API | Feature Toggle API |
| PL-29478 | TooltipFieldPath Lookup | Enhance Approval flow to be u |

FIG. 2B depicts the results of applying a density-based clustering algorithm (e.g., a density-based spatial clustering of applications with noise (DBSCAN) algorithm), which includes a first cluster 210 and an outlier value 220. The clustering behavior of the density-based clustering algorithm may be adjusted by varying the radius of each cluster (e.g., the parameter E) and/or the minimum quantity of data points that must be within the radius of a data point in order for that data point to be considered the core data point of a cluster.

Referring again to FIG. 2B, the historical runtime of the test may be determined based on the historical runtimes included in the first cluster 210 but not the outlier value 220. Moreover, FIG. 2B depicts a phenomenon in which additional clusters, such as the second cluster 230, may form over time as the test included in the test suite 122 undergo one or more updates that change the runtime of the test. For example, the runtime of the test may increase (or decrease) if the test is updated to probe more (or less) functionalities. In order to account for legitimate changes in the runtime of the test, the test controller 110 may be configured to perform the clustering algorithm not on the entire collection of historical runtimes but on the most recent n quantity of historical runtimes. In doing so, the result of the clustering algorithm may undergo a gradual transition that is consistent with the legitimate changes in the runtimes of the test. For instance, as the runtime of the test changes due to the updates to the test, the second cluster 230 may gradually grow in size and dominate the computation of the expected runtime with each successive run of the updated test.

Figure 4:
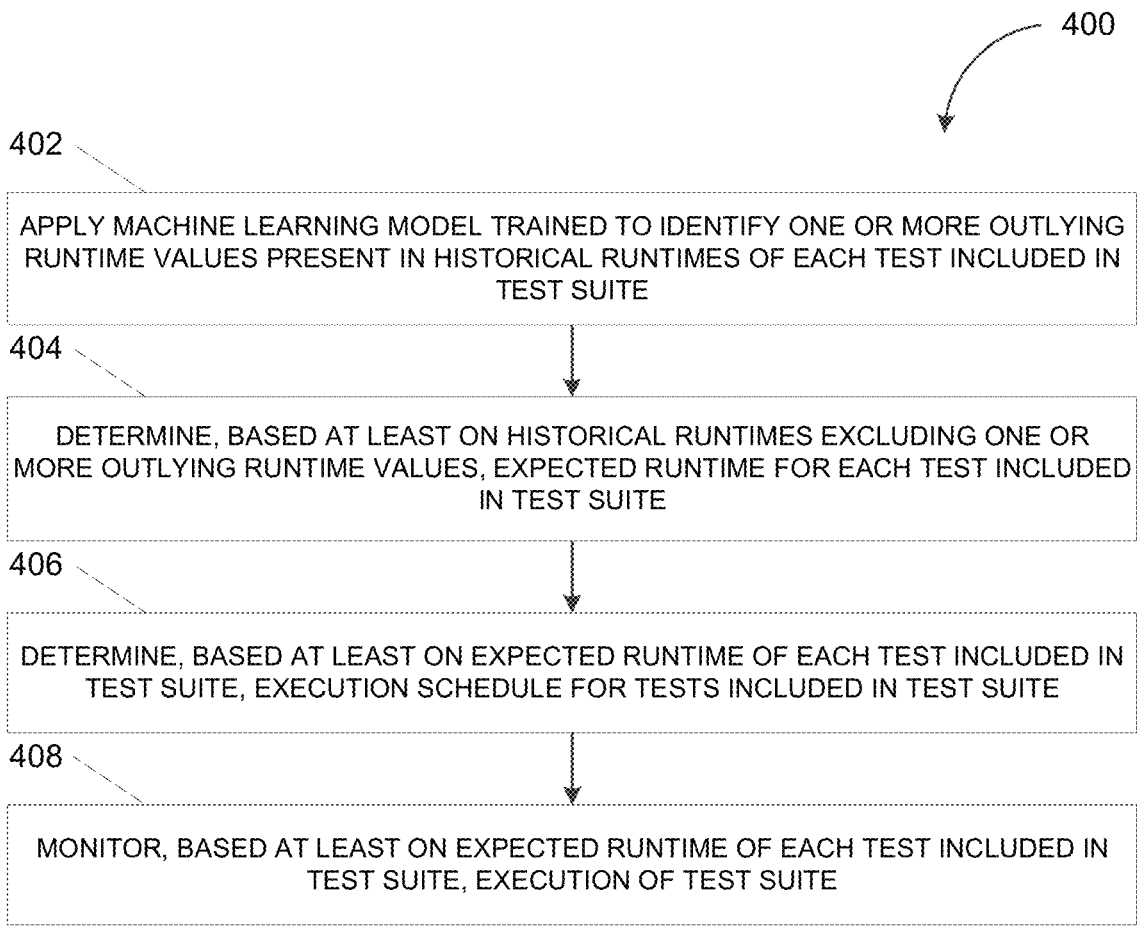
FIG. 4 depicts a flowchart illustrating an example of a process for machine learning based orchestration of software testing, in accordance with some example embodiments.

FIG. 4 depicts a flowchart illustrating an example of a process 400 for machine learning based orchestration of software testing, in accordance with some example embodiments. Referring to FIGS. 1-4, the process 400 may be performed by the test controller 110.

At 402, the test controller 110 may apply a machine learning model trained to identify one or more outlying runtime values present in the historical runtimes of each test included in a test suite. In some example embodiments, outlying runtime values present in the historical runtimes of a test included in a test suite associated with a software product may be detected by applying one or more anomaly detection techniques. One example of anomaly detection technique include a clustering algorithm such as hierarchical clustering, centroid-based clustering, distribution-based clustering, density-based clustering, and grid-based clustering. Other examples of anomaly detection techniques that may be applied to identifying outlying runtime values include support vector machines, neural networks, Bayesian networks, Hidden Markov models, association rule learning, and fuzzy logic. To account for legitimate changes in the runtime of the test, the test controller 110 may perform anomaly detection not on the entire collection of historical runtimes but on the most recent n quantity of historical runtimes. That is, the computation of expected runtimes may exclude outdated historical runtimes such as historical runtimes that are not part of the most recent n quantity of historical runtimes. In doing so, the result of the anomaly detection may undergo a gradual transition that is consistent with the legitimate changes in the runtimes of the test.

At 404, the test controller 110 may determine, based on the historical runtimes excluding the one or more outlying runtime values, an expected runtime for each test included in the test suite. The presence of outlying runtime values may distort the computation of the expected runtime for the test. As such, in some example embodiments, the test controller 110 may exclude outlying runtime values from the expected runtime computation for the test. For example, instead of an average across all historical runtimes associated with the test, the expected runtime of the test may correspond to an average of the non-outlying runtime values.

At 406, the test controller 110 may determine, based at least on the expected runtime of each test included in the test suite, an execution schedule for the tests included in the test suite. In some example embodiments, the test controller 110 may generate a schedule for the tests included in the test suite that minimizes the overall runtime of the test suite. The scheduling may include determining the sequence of tests that are executed in parallel each one of the available test environments (e.g., systems or realms emulating the production environment for the software product). As noted, one example strategy to minimize the overall runtime of a test suite may be to schedule tests with longer expected runtimes before tests with shorter expected runtimes and distribute the tests with the longer expected runtimes for parallel execution across the available test environments.

At 408, the test controller 110 may monitor, based at least on the expected runtime of each test included in the test suite, the execution of the test suite. In some example embodiments, additional time savings may be realized by not fully executing tests and/or test suites that are likely to fail. Accordingly, the test controller 110 may monitor the progress of the testing based on deviations from the expected runtimes of the tests included in the test suite. When the runtime of a test exceeds the expected runtime of the test by a threshold quantity, the test controller 110 may determine that the test is likely to fail and generate a recommendation to terminate the test before the test is executed in its entirety. Alternatively and/or additionally, when more than a threshold quantity of tests in the test suite exceed their expected runtimes, the test controller 110 may determine that the test suite is likely to fail and thus generate a recommendation to terminate the test suite before the test suite is executed in its entirety.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

Example 2: The system of example 1, wherein the portion of historical runtimes includes an n quantity of most recent runtimes.

Example 3: The system of example 2, wherein the portion of historical runtimes further excludes outdated historical runtimes that are not part of the n quantity of most recent runtimes.

Example 4: The system of any one of examples 1 to 3, wherein the expected runtime of each of the plurality of tests corresponds to an average, a mode, a medium, a maximum, and/or a minimum of the portion of historical runtimes excluding the one or more outlying runtime values.

Example 5: The system of any one of examples 1 to 4, wherein the machine learning model comprises one or more of a hierarchical clustering, a centroid-based clustering, a distribution-based clustering, a density-based clustering, and a grid-based clustering.

Example 6: The system of any one of examples 1 to 5, wherein the machine learning model comprises one or more of a support vector machine, a neural network, a Bayesian network, a Hidden Markov model, an association rule learning, and fuzzy logic.

Example 7: The system of any one of examples 1 to 6, wherein the schedule is determined by at least determining, based at least on the expected runtime of each of the plurality of tests, a first sequence of tests that is executed in parallel with a second sequences of tests.

Example 8: The system of any one of examples 1 to 7, wherein the schedule is determined by at least distributing, based on the expected runtime for each of the plurality of tests, the plurality of tests for execution across a plurality of test environments.

Example 9: The system of any one of examples 1 to 8, wherein the schedule is determined by at least scheduling a first test with a longer expected runtime for execution before a second test with a shorter expected runtime.

Example 10: The system of any one of examples 1 to 9, wherein the operations further comprise: monitoring, based at least on the expected runtime of each of the plurality of tests, the executing of the test suite.

Example 11: The system of example 10, wherein the monitoring includes terminating the executing of a test in the test suite in response to the test exceeding an expected runtime of the test by a threshold quantity.

Example 12: The system of any of examples 10 to 11, wherein the monitoring includes terminating the executing of the test suite in response to more than a threshold quantity of tests in the test suite exceeding a corresponding expected runtime.

Example 10: A method, comprising: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

Example 14: The method of example 13, wherein the portion of historical runtimes includes an n quantity of most recent runtimes, and wherein the portion of historical runtimes further excludes outdated historical runtimes that are not part of the n quantity of most recent runtimes.

Example 15: The method of any one of examples 13 to 14, wherein the schedule is determined by at least distributing, based on the expected runtime for each of the plurality of tests, the plurality of tests for execution across a plurality of test environments.

Example 16: The method of any one of examples 13 to 15, wherein the schedule is determined by at least scheduling a first test with a longer expected runtime for execution before a second test with a shorter expected runtime.

Example 17: The method of any one of examples 13 to 16, further comprising: monitoring, based at least on the expected runtime of each of the plurality of tests, the executing of the test suite.

Example 18: The method of example 17, wherein the monitoring includes terminating the executing of a test in the test suite in response to the test exceeding an expected runtime of the test by a threshold quantity.

Example 19: The method of any one of examples 17 to 18, wherein the monitoring includes terminating the executing of the test suite in response to more than a threshold quantity of tests in the test suite exceeding a corresponding expected runtime.

Example 20: A non-transitory computer readable medium storing instructions, which when executed by at least one data processor, result in operations comprising: applying, to at least a portion of historical runtimes associated with each of a plurality of tests included in a test suite, a machine learning model trained to identify one or more outlying runtime values; determining, based on at least the portion of historical runtimes excluding the one or more outlying runtime values, an expected runtime for each of the plurality of tests; determining, based at least on the expected runtime of each of the plurality of tests, a schedule for executing each of the plurality of tests in the test suite; and executing the test suite in accordance with the schedule for executing each of the plurality of tests in the test suite.

Figure 5:
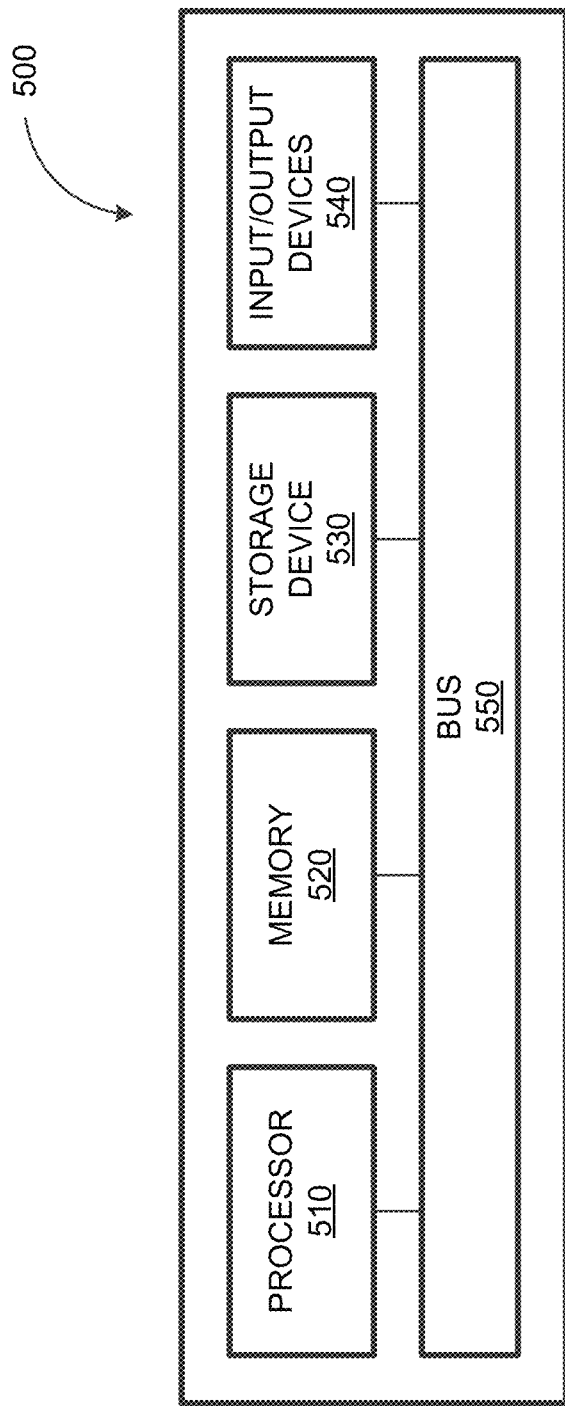
FIG. 5 depicts a block diagram illustrating an example of a computing system, in accordance with some example embodiments.

FIG. 5 depicts a block diagram illustrating a computing system 500 consistent with implementations of the current subject matter. Referring to FIGS. 1 and 5, the computing system 500 can be used to implement the test controller 110, the test engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the test controller 110, the test engine 120, and/or the like. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions, which when executed by the at least one data processor, cause operations comprising:
        applying, to at least a portion of historical runtimes associated with each of a plurality of tests included in a test suite, a machine learning model trained to identify one or more outlying runtime values;
        determining, based on at least the portion of historical runtimes excluding the one or more outlying runtime values, an expected runtime for each of the plurality of tests;
        determining, based at least on the expected runtime of each of the plurality of tests, a schedule for executing each of the plurality of tests in the test suite; and
        executing the test suite in accordance with the schedule for executing each of the plurality of tests in the test suite.

2. The system of claim 1, wherein the portion of historical runtimes includes an n quantity of most recent runtimes.

3. The system of claim 2, wherein the portion of historical runtimes further excludes outdated historical runtimes that are not part of then quantity of most recent runtimes.

4. The system of claim 1, wherein the expected runtime of each of the plurality of tests corresponds to an average, a mode, a medium, a maximum, and/or a minimum of the portion of historical runtimes excluding the one or more outlying runtime values.

5. The system of claim 1, wherein the machine learning model comprises one or more of a hierarchical clustering, a centroid-based clustering, a distribution-based clustering, a density-based clustering, and a grid-based clustering.

6. The system of claim 1, wherein the machine learning model comprises one or more of a support vector machine, a neural network, a Bayesian network, a Hidden Markov model, an association rule learning, and fuzzy logic.

7. The system of claim 1, wherein the schedule is determined by at least determining, based at least on the expected runtime of each of the plurality of tests, a first sequence of tests that is executed in parallel with a second sequences of tests.

8. The system of claim 1, wherein the schedule is determined by at least distributing, based on the expected runtime for each of the plurality of tests, the plurality of tests for execution across a plurality of test environments.

9. The system of claim 1, wherein the schedule is determined by at least scheduling a first test with a longer expected runtime for execution before a second test with a shorter expected runtime.

10. The system of claim 1, wherein the operations further comprise:
    monitoring, based at least on the expected runtime of each of the plurality of tests, the executing of the test suite.

11. The system of claim 10, wherein the monitoring includes terminating the executing of a test in the test suite in response to the test exceeding an expected runtime of the test by a threshold quantity.

12. The system of claim 10, wherein the monitoring includes terminating the executing of the test suite in response to more than a threshold quantity of tests in the test suite exceeding a corresponding expected runtime.

13. A computer-implemented method, comprising:
    applying, to at least a portion of historical runtimes associated with each of a plurality of tests included in a test suite, a machine learning model trained to identify one or more outlying runtime values;
    determining, based on at least the portion of historical runtimes excluding the one or more outlying runtime values, an expected runtime for each of the plurality of tests;
    determining, based at least on the expected runtime of each of the plurality of tests, a schedule for executing each of the plurality of tests in the test suite; and
    executing the test suite in accordance with the schedule for executing each of the plurality of tests in the test suite.

14. The method of claim 13, wherein the portion of historical runtimes includes an n quantity of most recent runtimes, and wherein the portion of historical runtimes further excludes outdated historical runtimes that are not part of then quantity of most recent runtimes.

15. The method of claim 13, wherein the schedule is determined by at least distributing, based on the expected runtime for each of the plurality of tests, the plurality of tests for execution across a plurality of test environments.

16. The method of claim 13, wherein the schedule is determined by at least scheduling a first test with a longer expected runtime for execution before a second test with a shorter expected runtime.

17. The method of claim 13, further comprising:
    monitoring, based at least on the expected runtime of each of the plurality of tests, the executing of the test suite.

18. The method of claim 17, wherein the monitoring includes terminating the executing of a test in the test suite in response to the test exceeding an expected runtime of the test by a threshold quantity.

19. The method of claim 17, wherein the monitoring includes terminating the executing of the test suite in response to more than a threshold quantity of tests in the test suite exceeding a corresponding expected runtime.

20. A non-transitory computer readable medium storing instructions, which when executed by at least one data processor, result in operations comprising:
- applying, to at least a portion of historical runtimes associated with each of a plurality of tests included in a test suite, a machine learning model trained to identify one or more outlying runtime values;
- determining, based on at least the portion of historical runtimes excluding the one or more outlying runtime values, an expected runtime for each of the plurality of tests;
- determining, based at least on the expected runtime of each of the plurality of tests, a schedule for executing each of the plurality of tests in the test suite; and
- executing the test suite in accordance with the schedule for executing each of the plurality of tests in the test suite.

* * * * *